(12) United States Patent
Ruhlander (10) Patent No.: US 7,530,288 B2
(45) Date of Patent: May 12, 2009

(54) AUTOMATIC ADJUST ASSEMBLY WITH RELEASE LOCK

(75) Inventor: Gregory Philip Ruhlander, Rochester Hills, MI (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 839 days.

(21) Appl. No.: 11/114,484

(22) Filed: Apr. 26, 2005

(65) Prior Publication Data

US 2006/0236806 A1  Oct. 26, 2006

(51) Int. Cl.
 *F16C 1/10* (2006.01)
 *F16B 9/00* (2006.01)
(52) U.S. Cl. .............. 74/502.4; 74/502.6; 74/500.5; 403/195; 403/197
(58) Field of Classification Search ..... 74/502.4–502.6, 74/500.5; 403/195, 197, 316; 439/545
 See application file for complete search history.

(56) References Cited

U.S. PATENT DOCUMENTS

| | | | | |
|---|---|---|---|---|
| 3,572,159 | A | * | 3/1971 | Tschanz ............... 74/502.5 |
| 5,178,034 | A | | 1/1993 | Reasoner |
| 5,598,743 | A | * | 2/1997 | Yasuda ............... 74/502.4 |
| 5,655,415 | A | * | 8/1997 | Nagle et al. ........... 74/502.6 |
| 6,131,482 | A | * | 10/2000 | Klippert et al. ....... 74/502.6 |
| 7,146,875 | B2 | * | 12/2006 | Gordy et al. .......... 74/502.4 |

* cited by examiner

*Primary Examiner*—Vinh T. Luong
(74) *Attorney, Agent, or Firm*—Gifford, Krass, Sprinkle, Anderson & Citkowski, P.C.; Kevin S. MacKenzie; Dean B. Watson (57) ABSTRACT

A motion transmitting remote control cable assembly includes a conduit having first and second ends and a central axis. A core wire is disposed along the central axis of the conduit. A molded fitting having first and second ends and a central bore is disposed at a first end of the conduit. The core wire extends through the central bore of the molded fitting. A hollow slider body including an outer peripheral surface and opposing first and second ends includes a central bore extending from the first to the second end. The core wire extends through the central bore of the hollow slider body. The hollow slider includes a slot formed through a top of the outer peripheral surface that defines a lock cavity. The molded fitting is movably disposed in the central bore of the hollow slider body. A spring that engages the hollow slider body in the molded fitting biases the hollow slider body and molded fitting apart. A lock member is disposed in the lock cavity and includes a varying sized lock slot formed therethrough. The molded fitting is disposed in the varying sized lock slot. The lock member is movable from an initial position where the lock member engages the molded fitting preventing movement of the molded fitting relative to the hollow slider body to an adjustment position allowing movement of the molded fitting relative to the hollow slider body for automatically adjusting slack in the core wire. The lock member is also movable to a locked position where the lock member engages the molded fitting preventing movement of the molded fitting relative to the hollow slider body. The lock member, hollow slider body and molded fitting are interconnected following assembly to prevent separation of the various components during shipping or installation.

18 Claims, 6 Drawing Sheets

AUTOMATIC ADJUST ASSEMBLY WITH RELEASE LOCK

FIELD OF THE INVENTION

The invention relates to motion-transmitting remote control cable assemblies and more particularly to motion-transmitting remote control cable assemblies for a push-pull cable system to self adjust a cable once installed in the cable system.

BACKGROUND OF THE INVENTION

Motion-transmitting remote control cable assemblies, also referred to as "Bowden cables" or "push-pull cables", are used for transmitting both force and travel along a curved path in aircraft, automotive, and marine environments. Known cable assemblies can be used for transmitting load and motion in both push and pull type applications. Typical automotive applications include but are not limited to parking brakes, accelerators, hood releases, brake releases, trunk releases, park lock, tilt wheel controls, fuel filler doors, transmission shifter cables, and hydraulic control cables.

A motion-transmitting remote control cable assembly for transmitting motion along a curved path typically includes a flexible core element (strand) slidably enclosed within a flexible outer sheath (conduit) with end fittings attached to both ends of each respective member. These fittings attach to and transmit load from the conduit to its mounting points and from the strand to its mounting points. The core element is adapted at one end to be attached to a member to be controlled whereas the other end is attached to an actuator for longitudinally moving the core element within the outer sheath. The outer sheath is adapted to be secured by the fittings to a support structure.

In such applications, it is often necessary to adjust the length or position of the conduit or core element of a cable system to remove slack from the system. The removal of slack assures that the cable is positioned such that miscommunication and lash problems are avoided in the cable system. These assemblies are often provided with means for adjusting the length of the strand or the conduit during installation and a lock to prevent change in length once installed. One approach has been to include a sliding lock which has teeth which slide into engagement with teeth of a longitudinally adjustable slider. For example, see U.S. Pat. Nos. 5,682,797, 5,161,428, and 4,418,583. While these prior devices are at least somewhat effective at locking the assembly at normal operating conditions, they can fail when excessive loads are applied. Accordingly, there is a need in the art for an improved locking device for a motion transmitting remote control cable assembly.

Typical motion-transmitting remote control cable assembly systems are shipped for installation in a cable system in a preloaded position. Once the adjuster is installed in the cable mechanism, a pin or external element is pulled and discarded to actuate the assembly. Such a design creates waste through the use of a discarded external pin and also contributes to problems in shipping, as such pins may unavoidably be removed during the shipping process. There is therefore a need in the art for an adjuster assembly with no parts that are removable or can be damaged during a shipping process. Additionally, there is also a need in the art for an adjuster assembly that may be easily designed to fit current cable interfaces with an overall reduction in the number of components compared to current prior art designs.

SUMMARY OF THE INVENTION

A motion-transmitting remote control cable assembly includes a conduit having first and second ends and a central axis. A core wire is disposed along the central axis of the conduit. A molded fitting having first and second ends and a central bore is disposed at a first end of the conduit. The core wire extends through the central bore of the molded fitting. A hollow slider body including an outer peripheral surface and opposing first and second ends includes a central bore extending from the first to the second end. The core wire extends through the central bore of the hollow slider body. The hollow slider includes a slot formed through a top of the outer peripheral surface that defines a lock cavity. The molded fitting is movably disposed in the central bore of the hollow slider body. A spring that engages the hollow slider body and the molded fitting biases the hollow slider body and molded fitting apart. A lock member is disposed in the lock cavity and includes a varying sized lock slot formed therethrough. The molded fitting is disposed in the varying sized lock slot. The lock member is movable from an initial position where the lock member engages the molded fitting preventing movement of the molded fitting relative to the hollow slider body to an adjustment position allowing movement of the molded fitting relative to the hollow slider body for automatically adjusting slack in the core wire. The lock member is also movable to a locked position where the lock member engages the molded fitting preventing movement of the molded fitting relative to the hollow slider body.

DETAILED DESCRIPTION OF THE PREFERRED EMBODIMENTS

Figure 1:
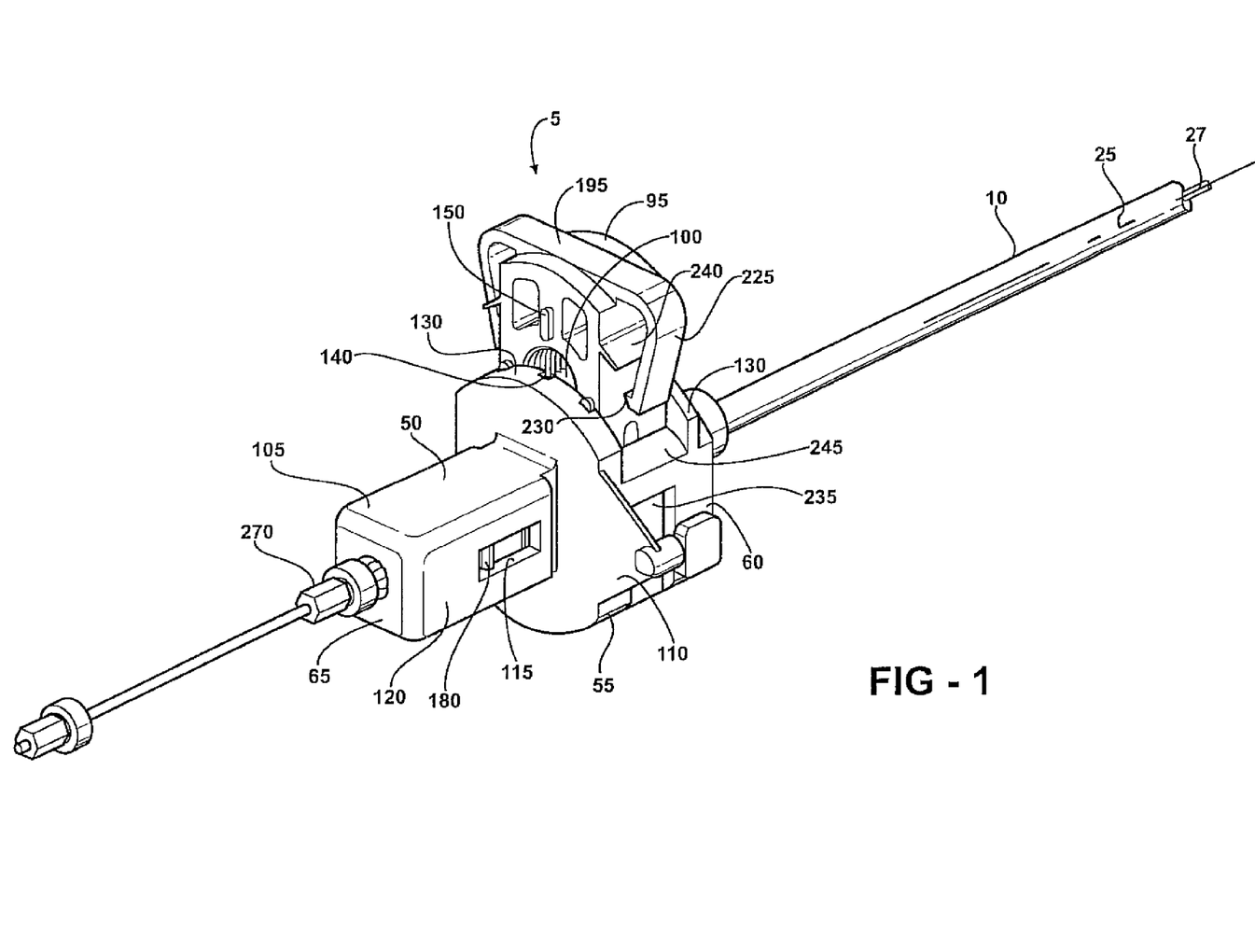
FIG. 1 is a perspective view of a motion-transmitting remote control cable assembly with the lock member in an initial position.
Figure 2:
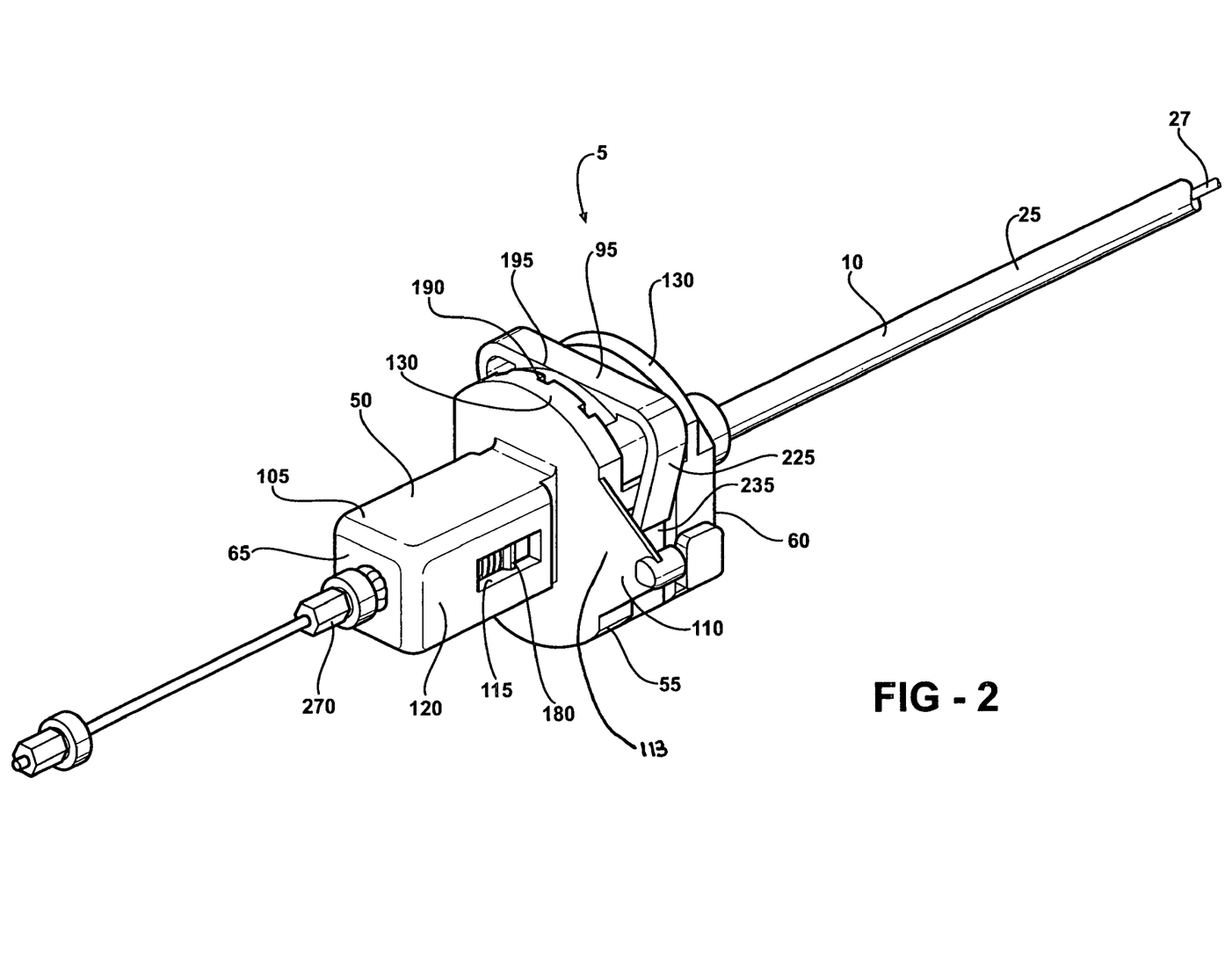
FIG. 2 is a perspective view of a motion-transmitting remote control cable assembly with the lock member in the locked position.
Figure 3:
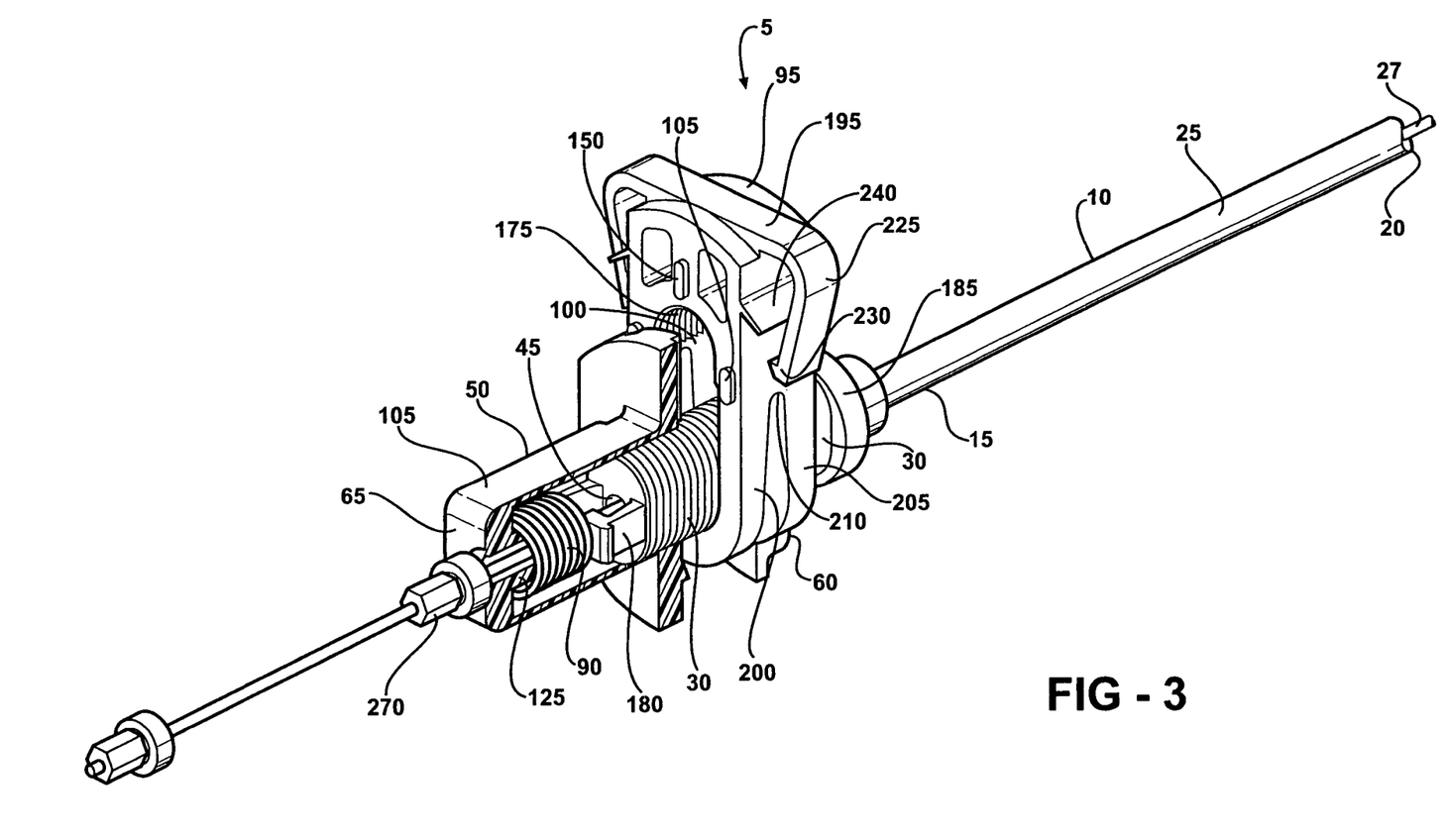
FIG. 3 is a cutaway perspective view detailing the lock member in an initial position.
Figure 5:
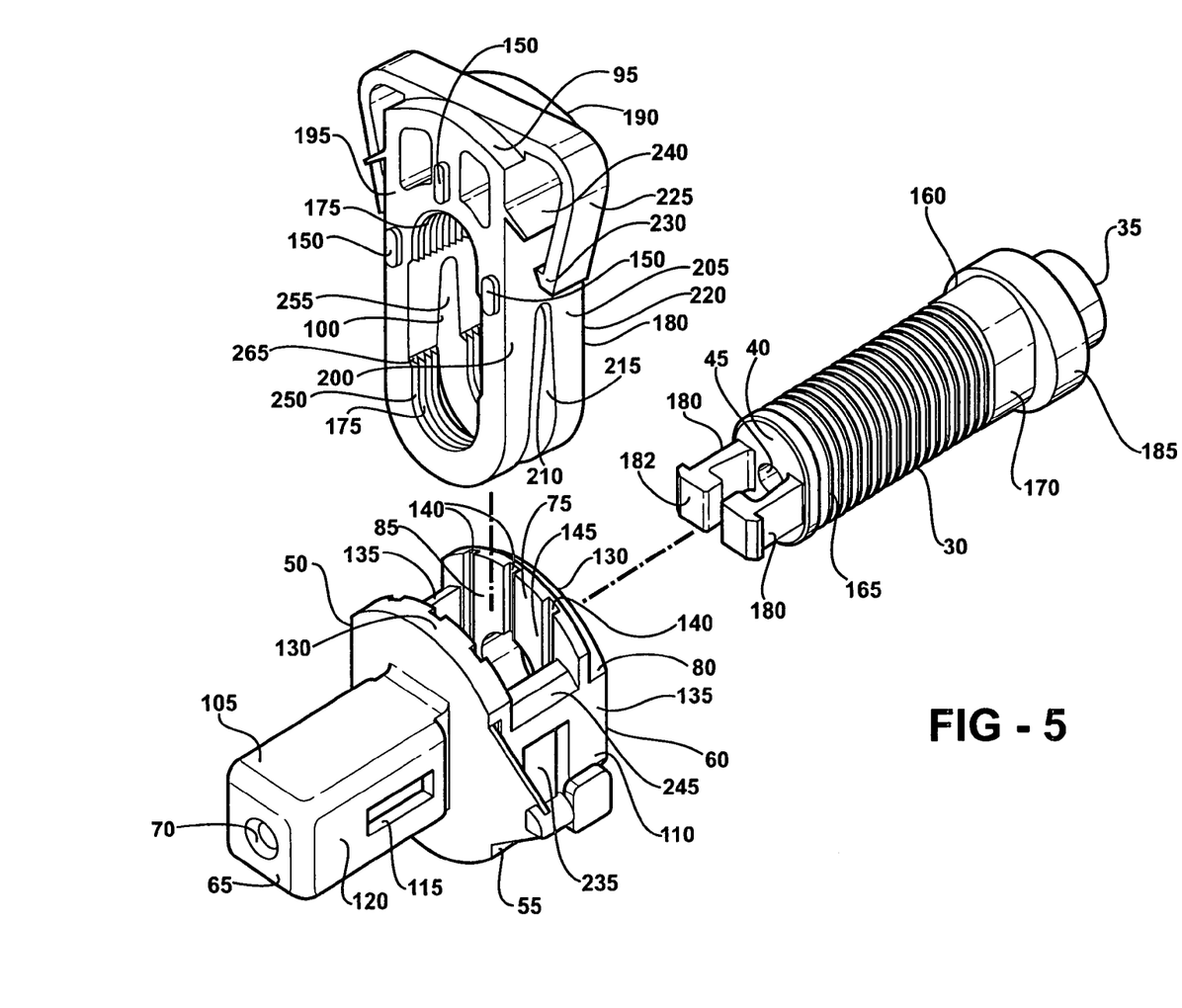
FIG. 5 is a perspective assembly view of a motion-transmitting remote control cable assembly according to the present invention.

Referring to FIGS. 3 and 5, there is shown a motion-transmitting remote control cable assembly 5 in accordance with a preferred embodiment of the present invention. The motion-transmitting remote control cable assembly 5 includes a conduit 10 having first and second ends 15, 20 and a central axis 25. A core wire 27 is disposed along the central axis 25 of the conduit 10. A molded fitting 30 including first and second ends 35, 40 has a central bore 45 that extends from the first end 35 to the second end 40. The molded fitting 30 is disposed at a first end 15 of the conduit 10 with the core wire 27 extending through the central bore 45 of the molded fitting 30. A hollow slider body 50 includes an outer peripheral surface 55 and opposing first and second ends 60, 65. The hollow slider body 50 also includes a central bore 70 extending from the first end 60 to the second end 65. The core wire 27 extends through the central bore 70 of the hollow slider body 50. The hollow slider body 50 includes a slot 75 that is formed through a top 80 of the outer peripheral surface 55. The slot 75 defines a lock cavity 85. The molded fitting 30 is movably disposed within the central bore 70 of the hollow slider body 50. A spring 90 engages the hollow slider body 50 and the molded fitting 30 for biasing the hollow body 50 and molded fitting 30 apart. A lock member 95 is received in the lock cavity 85 and includes a varying sized lock slot 100 formed therethrough. The molded fitting 30 is disposed in the variously sized lock slot 100.

The lock member 95 is movable from an initial position where the lock member 95 engages the molded fitting 30 preventing movement of the molded fitting 30 relative to the hollow slider body 50 to an adjustment position allowing movement of the molded fitting 30 relative to the hollow slider body 50 for automatically adjusting slack in the core wire 27. The lock member 95 is also movable to a locked position where the lock member 95 engages the molded fitting 30 preventing movement of the molded fitting 30 relative to the hollow slider body 50.

In a preferred aspect of the present invention, the hollow slider body 50 includes an extension portion 105 extending from the second end 65 and connected to a lock portion 110 extending toward the first end 60. As stated above, the hollow slider body 50 includes a central bore 70 extending from the first 60 to the second end 65, with the core wire 27 extending through the central bore 70 of the hollow slider body 50. The slot 75 formed through the top 80 of the outer peripheral surface 55 of the hollow slider body 50 is preferably formed at the lock portion 110 of the hollow slider body 50, thereby defining the lock cavity 85.

The extension portion 105 of the hollow slider body 50 includes a guide channel 115 formed through the side surface 120 for guiding the molded fitting 30, as will be discussed in more detail below. As best shown in FIG. 3, the hollow slider body 50 also includes at the extension portion 105, a cylindrical projection 125 extending internally from the second end 65 that is concentric with the central bore 70. The cylindrical projection 125 retains the spring 90 that biases the hollow slider body 50 and molded fitting 30 apart.

Figure 6:
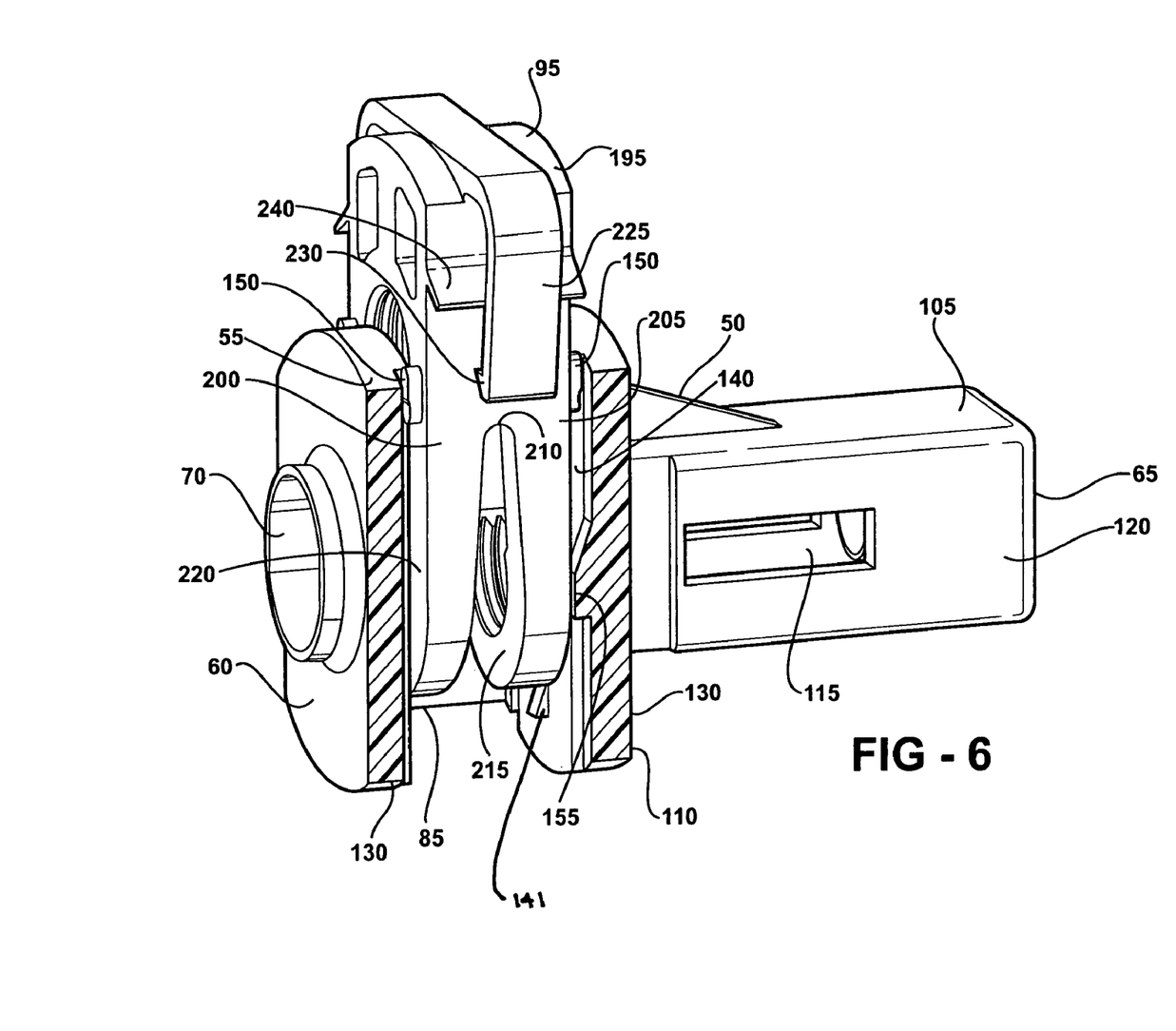
FIG. 6 is a cutaway perspective view of a lock member disposed in a hollow slider body.

The lock portion 110 of the hollow slider body 50 includes the slot 75 formed through the outer peripheral surface 55 defining the lock cavity 85. In a preferred aspect, the lock cavity 85 includes opposing end walls 130 connected by opposing sidewalls 135. In a preferred aspect, the opposing end walls 130 include at least one guide slot 140 formed on the inner surfaces 145 of the end walls 130. In a preferred aspect of the present invention, three guide slots 140 are formed on the inner surfaces 145 of the end walls 130, as shown in FIG. 5. The guide slots 140 mate with tabs 150 formed on the lock member 95, as will be discussed in more detail below. The guide slots 140 preferably include ramp projections 155 formed thereon, as best seen in FIG. 6. Again, the ramp projections 155 engage the guide tabs 150 formed on the lock member 50 for cinching the lock member 95 relative to the hollow slider body 50, as will be discussed in more detail below. The lock portion 110 of the hollow slider body 50 also includes a triangular shaped assist tab 113 for attaching the hollow slider body 50 to a corresponding support structure (not shown). The assist tab 113 is preferably designed to be flexible to facilitate attachment and extraction of the hollow slider body 50.

The molded fitting 30 preferably is a cylindrical member 160 having a central bore 45, as described above. The cylindrical member 160 includes raised ridges 165 formed on an outer surface 170. The raised ridges 165 are designed to engage corresponding ridges 175 formed on the lock member 95. Additionally, the second end 40 of the molded fitting 30 preferably includes tabs 180 formed thereon. The tabs 180 are preferably movably retained in the guide channels 115 formed through the rectangular portion 105 of the hollow slider body 50. The tabs 180 limit the amount of travel of the molded fitting 30 relative to the hollow slider body 50 caused by the biasing spring 90. The tabs 180 on the second end 40 of the molded fitting 30 also include a bearing surface 182 that engages the biasing spring 90. The opposing first end 35 of the molded fitting 30 includes a peripheral collar 185 for engaging the first end 60 of the hollow slider body 50. This arrangement provides a stop on the molded fitting 30 limiting the distance the molded fitting 30 can be inserted into the hollow slider body 50.

The lock member 95 is a generally oval-shaped body 190 having a top portion 195 including downwardly extending opposing first and second legs 200, 205 joined by a radiused portion 210. Each of the first and second legs 200, 205 include inner and outer surfaces 215, 220. The top portion 195 of the lock member 95 includes outwardly downwardly extending locking arms 225 formed thereon. The locking arms 225 preferably terminate at hook ends 230 that are retained in notches 235 formed on the hollow slider body 50 when the lock member 95 is in the locked position. The top portion 195 of the lock member 95 also includes ramp tabs 240 formed thereon that engage a corresponding surface 245 on the hollow slider body 50 for biasing the hook ends 230 of the lock member 95 into secure engagement with the notches 235 formed on the hollow slider body 50. The ramp tabs 240 abut the corresponding surface 245 on the hollow slider body 50 causing a biasing force to be applied to the lock member 95 pulling it slightly upward relative to the hollow slider body 50, thereby assuring secure engagement of the hook ends 230 with the notches 235 formed on the hollow slider body 50.

As stated above, the lock member 95 includes a varying sized lock slot 100 that includes narrow top and bottom portions 250 separated by a wider center portion 255. In a preferred aspect, the narrow top and bottom portions 250 of the varying sized lock slot 100 include ridges 175 formed thereon for engaging the raised ridges 165 of the molded fitting 30. The lock slot 100 preferably includes a step transition 265 separating the narrow top and bottom portions 250 from the wide center portion 255 allowing for the smooth transition from the initial to the adjustment to the locked position.

In a preferred aspect, the outer surfaces 220 of the opposing first and second legs 200, 205 of the lock member 95 include at least one guide tab 150 formed thereon. The at least one guide tab 150 preferably includes three guide tabs 150 formed on the opposing legs 200, 205 that are received in the three guide slots 140 formed in the lock cavity 85, described above. The guide tabs 150 interact with the guide slots 140 assuring proper location of the lock member 95 within the lock cavity 85. Additionally, interaction between the ramp projections 155 formed on the guide slot 140 and the guide tab 150 cinches the lock member 95 within the lock cavity, as best seen in FIG. 6.

When the motion transmitting remote control cable assembly 5 is assembled, the lock member 95 is inserted within the lock cavity 85 and then the molded fitting 30 is inserted into the hollow slider body 50 passing through the varying sized guide slot 100. In this manner, the lock member 95 is securely retained within the lock cavity 85 and is not able to be removed once the motion transmitting remote control cable assembly 5 has been assembled. The core wire 27 extends through the molded fitting 30 and hollow slider body 50 terminating at a second end 65 of the hollow slider body 50. A strand button or ferrule 270 may be attached to the core wire 27 to contact an outer surface of the hollow slider body 50 at the second end 65.

Once the molded fitting 30 has been inserted into the hollow slider body 50, the spring 90 is then compressed and the lock member 95 is pulled upward securely retaining the molded fitting 30 in the initial position, wherein the molded fitting 30 and hollow slider body 50 are pretensioned relative to each other. The lock member 95, hollow slider body 50 and molded fitting 30 are interconnected following assembly to prevent separation of the various components during shipping or installation.

Figure 4A:
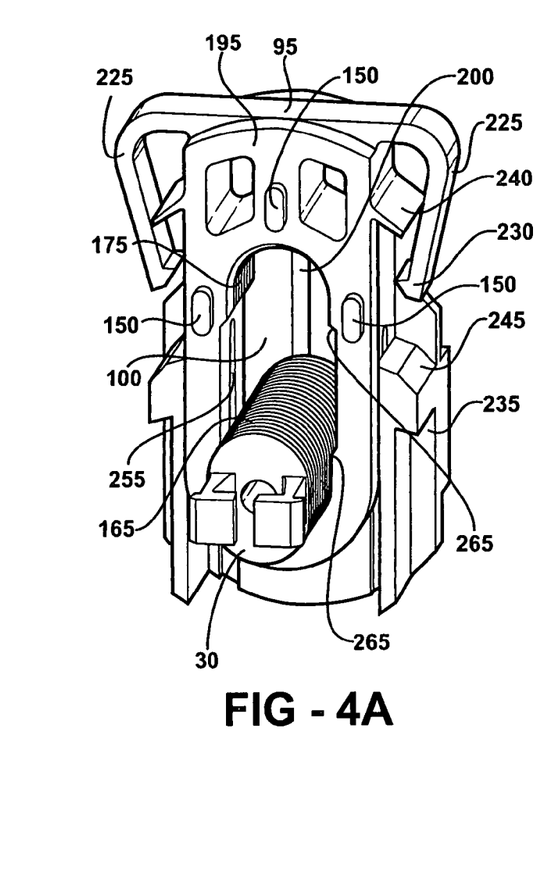
FIG. 4A is a partial perspective view detailing the lock member engaging a molded fitting in an initial position.

In use, after the motion-transmitting remote control cable assembly 5 has been assembled as outlined above, it is shipped in the initial position as best shown in FIG. 4A. In this position, the molded fitting 30 extends through the varying sized lock slot 100 of the lock member 95 and is retained at a bottom portion 250 of the lock slot 100 having teeth 260 formed thereon that engage the corresponding ridges 165 formed on the molded fitting 30. In this manner, the spring 90 remains under preload tension as the motion-transmitting remote control cable assembly 5 is applied to a cable system.

Figure 4B:
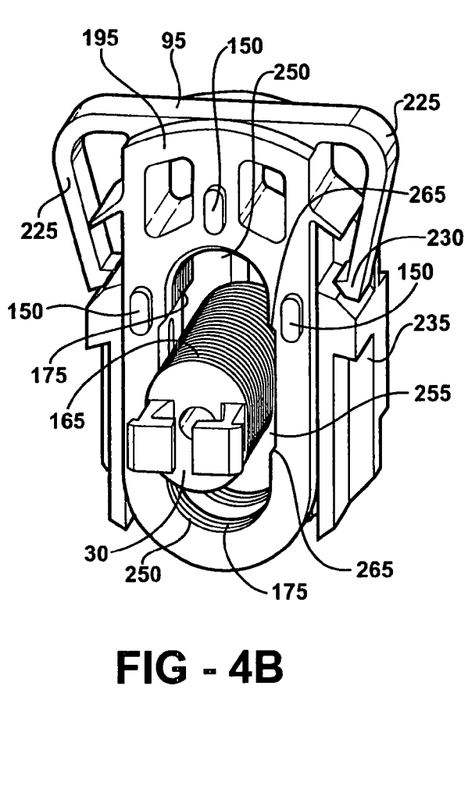
FIG. 4B is a partial perspective view of a lock member and molded fitting in an adjustment position.

Following installation of the motion-transmitting remote control cable assembly 5, the lock member 95 may then be pushed downward from the initial position to the adjustment position. At this point, the wide center portion 255 of the lock member 95 is proximate the molded fitting 30, freeing the molded fitting 30 from engagement with the bottom narrow portion 250 of the varying sized lock slot 100, allowing movement of the molded fitting 30 relative to the hollow slider body 50. The spring 90 disposed about the hollow slider body 50 biases against the tabs 180 of the molded fitting 30 pushing the molded fitting 30 and hollow slider body 50 apart and adjusting a length of a cable. The lock member 95 travels along the guide channels 140 formed in the lock cavity 85 with the tabs 150 of the lock member received in the corresponding guide channels 140. The lock slot 100 passes over triangular pads 141 formed on the inner surface 215 of the legs 200, 205. The triangular pads 141 prevent the lock member 95 from easily returning to the initial position, assuring free movement of the molded fitting 30 relative to the hollow slider body 50.

Figure 4C:
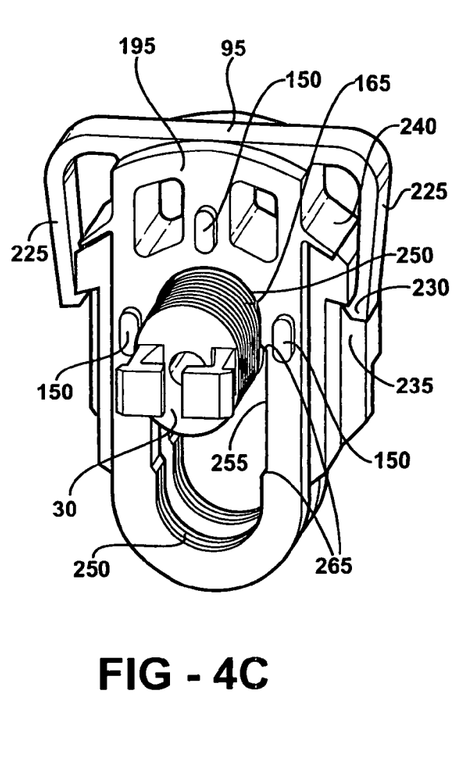
FIG. 4C is a partial perspective view of a lock member and molded fitting in a locked position.

Once the slack has been removed from the cable or core wire 27, the lock member 95 may then be further moved downward as shown in FIG. 4C, such that the molded fitting 30 is securely retained in the narrow top portion 250 of the varying sized lock slot 100. As with the lower portion of the lock slot 100, the teeth 260 formed on the top portion engage the ridges 165 formed on the molded fitting 30, securely retaining the molded fitting 30 against relative movement with respect to the hollow slider body 50. Additionally, the legs 200, 205 of the lock member 95, including the locking arms 225 pass over the hollow slider body 30 with the hook ends 230 retained in the notches 235 of the slider body 50. Additionally, the ramp tabs 240 of the lock member 95 engage the corresponding surfaces 245 of the hollow slider body 50 applying an upward biasing force to maintain secure engagement of the hook ends 230 with the notches 235 formed on the hollow slider body 50. In this position, the hollow slider body 50 is prevented from movement with respect to the molded fitting 30. Additionally, as the lock member 95 is pushed downward toward the lock position, the guide tabs 150 formed on the lock member 95 interact with the ramped projections 155 of the guide channels 140 securely cinching the lock member 95 with respect to the hollow slider body 50.

The invention has been described in an illustrative manner, and it is to be understood that the terminology that has been used is intended to be in the nature of description rather than limitation. Many modifications and variations of the present invention are possible in light of the above teachings. It is therefore to be understood that within the scope of the appended claims, the invention may be practiced other than as specifically described.

The invention claimed is:

1. A motion transmitting remote control cable assembly comprising:
   a conduit having first and second ends and a central axis;
   a core wire disposed along the central axis of the conduit;
   a molded fitting having first and second ends and a central bore extending from the first to the second end, the molded fitting disposed at a first end of the conduit, the core wire extending through the central bore of the molded fitting;
   a hollow slider body having an outer peripheral surface and opposing first and second ends, the hollow slider body including a central bore extending from the first to the second end the core wire extending through the central bore of the hollow slider body, the hollow slider body including a slot formed through a top of the outer peripheral surface, the slot defining a lock cavity, the molded fitting movably disposed in the central bore of the hollow slider body and the hollow slider body including guide channels formed through the outer peripheral surface proximate the second end of the hollow slider body;
   a spring engaging the hollow slider body and the molded fitting for biasing the hollow slider body and molded fitting apart;
   a lock member received in the lock cavity, the lock member including a varying sized lock slot formed there through, the molded fitting disposed in the varying sized lock slot; wherein the lock member is moveable from an initial position where the lock member engages the molded fitting preventing movement of the molded fitting relative to the hollow slider body, to an adjustment position allowing movement of the molded fitting relative to the hollow slider body for automatically adjusting slack in the conduit, to a locked position where the lock member engages the molded fitting preventing movement of the molded fitting relative to the hollow slider body.

2. The motion transmitting remote control cable assembly of claim 1 wherein the molded fitting includes tabs formed on the second end of the molded fitting, the tabs moveably retained in the guide channels formed through the hollow slider body.

3. The motion transmitting remote control cable assembly of claim 1 wherein the molded fitting includes locking teeth formed thereon.

4. The motion transmitting remote control cable assembly of claim 1 wherein the lock member includes locking teeth formed on selected portions of the varying sized lock slot for coupling with the locking teeth formed on the molded fitting.

5. The motion transmitting remote control cable assembly of claim 1 wherein the hollow slider body includes a cylindrical projection extending internally from the second end concentric with the central bore for retaining the spring.

6. The motion transmitting remote control cable assembly of claim 1 wherein the molded fitting includes a peripheral collar formed on the first end for engaging the first end of the hollow slider body.

7. The motion transmitting remote control cable assembly of claim 1 wherein the lock member includes a top portion having downwardly extending opposing first and second legs joined by a radiused portion, each of the first and second legs including inner and outer surfaces.

8. The motion transmitting remote control cable assembly of claim 7 wherein the top portion of the lock member includes outwardly downwardly extending locking arms formed thereon, the locking arms terminating at hook ends, the hook ends retained in notches formed on the hollow slider body when the lock member is in the locked position.

9. The motion transmitting remote control cable assembly of claim 8 wherein the top portion of the lock member includes ramp tabs formed thereon for engaging a corresponding surface on the hollow slider body thereby biasing the hook ends of the lock member into secure engagement with the notches formed on the hollow slider body.

10. The motion transmitting remote control cable assembly of claim 7 wherein the outer surfaces of the opposing legs include at least one guide tab formed thereon.

11. The motion transmitting remote control cable assembly of claim 10 wherein the lock cavity includes opposing end walls connected to opposing side walls.

12. The motion transmitting remote control cable assembly of claim 11 wherein the opposing end walls include at least one guide slot formed on inner surfaces of the end walls.

13. The motion transmitting remote control cable assembly of claim 12 wherein the at least one guide slot includes a ramped projection formed thereon.

14. The motion transmitting remote control cable assembly of claim 13 wherein the at least one guide tab formed on the opposing legs is received in the at least one guide slot for locating the lock member within the lock cavity wherein interaction between the ramped projection and the guide tab cinches the lock member within the lock cavity.

15. The motion transmitting remote control cable assembly of claim 1 wherein the varying sized lock slot includes narrow top and bottom portions separated by a wide center portion.

16. The motion transmitting remote control cable assembly of claim 15 wherein the narrow top and bottom portions include teeth formed thereon for engaging the molded fitting.

17. The motion transmitting remote control cable assembly of claim 15 wherein the lock slot includes a stepped transition separating the narrow top and bottom portions from the wide middle portion.

18. A motion transmitting remote control cable assembly comprising:
   a conduit having first and second ends and a central axis;
   a core wire disposed along the central axis of the conduit;
   a molded fitting having first and second ends and a central bore extending from the first to the second end, the molded fitting disposed at a first end of the conduit the core wire extending through the central bore of the molded fitting, the molded fitting including tabs formed on the second end of the molded fitting;
   a hollow slider body having an outer peripheral surface and opposing first and second ends, the hollow slider body including a central bore extending from the first to the second end, the core wire extending through the central bore of the hollow slider body, the hollow slider body including a slot formed through a top of the outer peripheral surface, the slot defining a lock cavity, the hollow slider body including guide channels formed through the outer peripheral surface proximate the second end of the hollow slider body, the molded fitting movably disposed in the central bore of the hollow slider body wherein the tabs formed on the second end of the molded fitting are moveably retained in the guide channels formed through the hollow slider body;
   a spring engaging the hollow slider body and the molded fitting for biasing the hollow slider body and molded fitting apart;
   a lock member received in the lock cavity, the lock member including a varying sized lock slot formed there through, the molded fitting disposed in the varying sized lock slot; wherein the lock member is moveable from an initial position where the lock member engages the molded fitting preventing movement of the molded fitting relative to the hollow slider body, to an adjustment position allowing movement of the molded fitting relative to the hollow slider body for automatically adjusting slack in the conduit, to a locked position where the lock member engages the molded fitting preventing movement of the molded fitting relative to the hollow slider body.

* * * * *